US010394396B2

(12) United States Patent
Chiang et al.

(10) Patent No.: US 10,394,396 B2
(45) Date of Patent: Aug. 27, 2019

(54) MULTI-FORCE TOUCH SENSING METHOD AND MULTI-FORCE TOUCH MODULE

(71) Applicant: TPK Touch Solutions (Xiamen) Inc., Xiamen (CN)

(72) Inventors: Cheng-Chung Chiang, Kaohsiung (TW); Feng Chen, Fuzhou (CN); Ho-Hsun Chi, Hsinchu (TW); Yuh-Wen Lee, Hsinchu (TW)

(73) Assignee: TPK Touch Solutions (Xiamen) Inc., Xiamen (CN)

( * ) Notice: Subject to any disclaimer, the term of this patent is extended or adjusted under 35 U.S.C. 154(b) by 81 days.

(21) Appl. No.: 15/425,998

(22) Filed: Feb. 6, 2017

(65) Prior Publication Data

US 2017/0228066 A1    Aug. 10, 2017

(30) Foreign Application Priority Data

Feb. 6, 2016  (CN) .......................... 2016 1 0083668

(51) Int. Cl.
| | |
|---|---|
| *G06F 3/044* | (2006.01) |
| *G06F 3/045* | (2006.01) |
| *G06F 3/041* | (2006.01) |

(52) U.S. Cl.
CPC .............. *G06F 3/044* (2013.01); *G06F 3/045* (2013.01); *G06F 3/0416* (2013.01); *G06F 2203/04104* (2013.01); *G06F 2203/04105* (2013.01)

(58) Field of Classification Search
CPC ........ G06F 3/044; G06F 3/045; G06F 3/0416; G06F 2203/04104; G06F 2203/04105
See application file for complete search history.

(56) References Cited

U.S. PATENT DOCUMENTS

| | | | |
|---|---|---|---|
| 2011/0148796 A1* | 6/2011 | Hollemans | G06F 3/044 345/173 |
| 2015/0002452 A1* | 1/2015 | Klinghult | G06F 3/0416 345/174 |

\* cited by examiner

*Primary Examiner* — Christopher E Leiby
(74) *Attorney, Agent, or Firm* — Cooper Legal Group, LLC

(57) ABSTRACT

A multi-force touch module includes first sensing electrodes disposed along X coordinate and second sensing electrodes disposed along Y coordinate. A multi-force touch sensing method for the multi-force touch module includes the following steps: detecting press position information, determining whether press positions are located at a same position on X axis, and detecting resistance values of the press positions on X axis or Y axis according to a result thus determined; and determining magnitudes of pressing forces at the press positions according to magnitudes of the resistance values.

12 Claims, 10 Drawing Sheets

MULTI-FORCE TOUCH SENSING METHOD AND MULTI-FORCE TOUCH MODULE

RELATED APPLICATIONS

This application claims priority to China Application Serial Number 201610083668.6, filed Feb. 6, 2016, which is herein incorporated by reference.

TECHNICAL FIELD

The present disclosure relates to a touch field. More particularly, the present disclosure relates to a multi-force touch sensing method and a multi-force touch module.

BACKGROUND

With the rapid development of touch panel technology, the touch panel technology has significant improvements and progress in aspects, such as product thickness, functions, etc., due to the influence and dictates of lightness, clearness, thinness, narrowness of electronic products and simplified input operations. Current resistive and capacitive touch panels can determine coordination positions on an X-Y plane through touch sensing, and realize touch input based on changes of coordination positions. With the continuous development, the current panels using single coordinate input cannot satisfy the versatile functional requirements of electronic devices. For instance, it can only sense plane positions of signals. This arrangement of the single signal input cannot fulfill the demand of the masses. For example, when multiplayers are operating, the signal inputs cannot be extended if the system only senses touch positions, and thus, the entertainment experience is significantly reduced.

In order to solve the above problem, the current solution is to add at least one electrode layer that is used for sensing the magnitude of pressure to the current touch panel. The capacitive pressure sensing principle is employed to determine the magnitude of pressing force. The capacitive pressure sensing method is to space apart the electrode layer a specific distance from a ground structure by using a support structure so as to form two capacitor plates. After being pressed by an external force, the distance between the two capacitive plates is decreased, and thus a capacitance value change is sensed by the electrode layer. A control system then senses the magnitude of the pressure according to the change in the capacitance value. The only insufficiency is that the capacitive pressure sensing principle is used for sensing deformations of the two capacitive plates, and the deformations are macro changes and have a larger influence range. When a finger touches one or more positions, points in its vicinity will also be affected to generate obvious changes in capacitances. The recognition rate of capacitive pressure sensing is therefore lower, and the accurate sensing of multi-finger force touch cannot be achieved.

Reference is now made to FIG. 1A, which is illustrated with the current capacitive sensing electrodes. The capacitive sensing principle in FIG. 1A is that: a distance d, between a first sensing electrode 101 and a second sensing electrode 102, is varied when the first sensing electrode 101 and the second sensing electrode 102 are depressed by a pressing force F. As a result, a further change is present in a capacitance value between the first sensing electrode 101 and the second sensing electrode 102. An amount of a capacitance value change between the two electrodes is positively correlated with a change amount of d. A magnitude of the pressing force F can thus be detected according to the amount of the capacitance value change to realize the force touch function.

Reference is now made to FIG. 1B. A force touch panel 100 having capacitive pressure sensing electrodes is provided. An X-Y coordinate system is provided. When an object (such as a finger) presses position A (or position B) of the force touch panel 100 shown in FIG. 1, the pressing force allows the distance d between the first sensing electrode 101 and the second sensing electrode 102 of the force touch panel 100 to change. The change of the distance d between the first sensing electrode 101 and the second sensing electrode 102 (that is, deformation) is a macro shape change, which affects a wide range and has more influences on adjacent positions.

For example, when a pressing force F presses position A (or position B), a capacitance at position A (or position B) changes, and a capacitance at a position adjacent to position A (or position B) subsequently changes obviously. It is thus difficult to distinguish whether pressing actions having different forces have respectively occurred at the two adjacent positions or only one pressing action has occurred. Even more, when forces are simultaneously exerted on two adjacent points, center of gravity possibly deviates so that the extents of deformations affect each other. The deformed positions and deformation extents thus cannot be accurately determined. Hence, the current capacitive pressure sensing electrode can only accurately identify one pressure.

Deformation extents of position A and position B of the force touch panel 100 shown in FIG. 1B after being applied by pressing forces and deformation extents of other adjacent positions are presented in Table 1A and Table 1B. X direction, Y direction, and a diagonal direction of the force touch panel 100 serve as examples in the tables for illustrating affected paths of positions adjacent to positions being pressed by the pressing forces, and distances between press positions and an edge (such as a bezel) of the force touch panel 100 along the above three direction are equally divided into positions (such as a first position, a second position, etc.). The deformation extents (changes of capacitance values are measurement criteria) are represented by percentages, and the deformation extents at the press positions are set as 100%.

TABLE 1A

The relational table of changes of deformation extents (capacitance values) after position A is pressed by a pressing force in capacitive pressure sensing.

| Item | Press Position | $1^{st}$ Position | $2^{nd}$ Position | $3^{rd}$ Position | $4^{th}$ Position | $5^{th}$ Position |
|---|---|---|---|---|---|---|
| X Direction (a1) | 100% | 96% | 77% | 54% | 28% | 8% |
| Y Direction (a2) | 100% | 97% | 86% | 66% | 42% | 11% |
| Diagonal Direction (a3) | 100% | 91% | 62% | 30% | 5% | 0% |

TABLE 1B

The relational table of changes of deformation extents (capacitance values) after position B is pressed by a pressing force in capacitive pressure sensing.

| Item | Press Position | 1st Position | 2nd Position | 3rd Position | 4th Position | 5th Position |
|---|---|---|---|---|---|---|
| X Direction (b1) | 100% | 40% | 18% | 9% | 3% | 0% |
| Y Direction (b2) | 100% | 71% | 44% | 9% | 3% | 0% |
| Diagonal Direction (b3) | 100% | 94% | 35% | 12% | 3% | 0% |

As can be seen from Table 1A and Table 1B, when a finger presses position A and position B, influences on the positions adjacent to the press positions (such as the first position along X direction, Y direction, or the diagonal direction) by the pressing forces are greater in the capacitive pressure sensing according to the prior art. As shown in Table 1A, when position A is the press position, the deformation extents of the positions adjacent to position A along X direction, Y direction, and the diagonal direction are roughly equivalent to the deformation extents of position A (the difference is less than about 10%). Hence, distinctness cannot be effectively achieved. As shown in Table 1B, when position B is the press position, at a minimum the deformation extent of the position adjacent to position B along the diagonal direction is roughly equivalent to the deformation extent of position B. It is thus understood that the prior art multi-touch sensing method cannot effectively distinguish the press position from the adjacent position along at least one direction when the press positions are position A and position B.

Reference is now made to FIG. 2A to FIG. 2D. FIG. 2A to FIG. 2D are curves indicating relation between a distance between press positions by two fingers and a pressing signal change after applying pressing forces having the same magnitude, by two fingers, to the force touch panel 100. In the figures, the abscissa is the distance between the press positions by the two fingers, and the ordinate is the pressing signal change. The pressing signal change is a change of signal, such as resistance, voltage, or current. FIG. 2A to FIG. 2D respectively indicate that the distances between the press positions by the two fingers are 10 mm, 20 mm, 30 mm, and 60 mm. The press positions by the two fingers sense the pressing signal changes and there are no obvious peak resistance values because of the pressing forces. The signal change caused by two-finger press cannot be effectively distinguished. Hence, it is not easy for the prior art capacitive array pressure sensing method to achieve accurate multi-force sensing.

For the forgoing reasons, there is a need to solve the above-mentioned problems by providing a multi-force touch sensing method and a multi-force touch module.

SUMMARY

In one aspect, a multi-force touch sensing method is provided. At least one press input to an X-Y coordinate formed by a multi-force touch module (the multi-force touch module comprises first sensing electrodes disposed along X direction and second sensing electrodes disposed along Y direction) is provided. The multi-force touch sensing method comprises the following steps: step (a): detecting and obtaining press position information that are coordinates of an mth point (Xm, Ym) . . . coordinates of an nth point (Xn, Yn) (where m≥1, n>m); step (b): determining whether Xn is equal to Xm, if yes, go to step (c), if not, go to step (d); step (c): detecting resistance values corresponding to Y axis at Yn and Ym, and determining magnitudes of pressing forces at press positions (Xn, Yn) and (Xm, Ym) respectively according to magnitudes of the resistance values; and step S104: detecting resistance values corresponding to X axis at Xn and Xm, and determining the magnitudes of the pressing forces at the press positions (Xn, Yn) and (Xm, Ym) respectively according to magnitudes of the resistance values.

In some embodiments, the multi-force touch module records a mutual capacitance value between each of the first sensing electrodes that are not pressed and each of the second sensing electrodes that are not pressed as a normal mutual capacitance value in the case of no pressing.

In one or more embodiments, step (a) further comprises: driving the first sensing electrodes sequentially, and scanning the second sensing electrodes simultaneously or sequentially after driving each of the first sensing electrodes, comparing the mutual capacitance value thus scanned with the normal mutual capacitance value, recording an abnormal mutual capacitance value when the mutual capacitance value thus scanned is not the same as the normal mutual capacitance value, and determining X-Y coordinates of the press position according to a position of the second sensing electrode where the abnormal mutual capacitance value is scanned on Y axis and a position of the first sensing electrode on X axis.

In one or more embodiments, the multi-force touch module records a resistance value of each of the first sensing electrodes that are not pressed and the second sensing electrodes that are not pressed as an initial resistance value in the case of no pressing and corresponding relationships between resistance value changes and the magnitudes of the pressing forces corresponding to the resistance value changes.

In one or more embodiments, step (c) further comprises: scanning the resistance values of the second sensing electrodes located at Yn and Ym and recording the resistance values as press resistance values, recording differences between the press resistance values and the initial resistance value as the resistance value changes, and determining the resistance value changes to be the magnitudes of the pressing forces at the press positions (Xn, Yn) and (Xm, Ym) according to the corresponding relationships between the resistance value changes and the magnitudes of the pressing forces; or step S104 further comprises: scanning the resistance values of the first sensing electrodes located at Xn and Xm and recording the resistance values as the press resistance values, recording differences between the press resistance values and the initial resistance value as the resistance value changes, and determining the resistance value changes to be the magnitudes of the pressing forces at the press positions (Xn, Yn) and (Xm, Ym) according to the corresponding relationships between the resistance value changes and the magnitudes of the pressing forces.

In one or more embodiments, the multi-force touch sensing method of further comprises the following steps before step (a) is performed: step (e): performing charging and discharging scan to the first sensing electrodes and the second sensing electrodes; step (f): determining that there is the press input according to a change of a capacitance value signal that has been scanned, and then going to step (g); step (g): determining whether a number of the press positions is greater than one, if yes, go to step (a), if not, go to step (h), and step (h): detecting a resistance value change of an electrode at a position of X axis where the press position is located, and determining the magnitude of the pressing force according to the resistance value change.

The disclosure provides a multi-force touch module. The multi-force touch module comprises first sensing electrodes disposed along X axis and second sensing electrodes disposed along Y axis. The first sensing electrodes and the second sensing electrodes are configured to provide at least one press input in an X-Y coordinate system. When the first sensing electrodes where press positions are located on are the same, resistance values of the second sensing electrodes corresponding to the press positions are detected; when the first sensing electrodes where the press positions are located on are not the same, resistance values of the first sensing electrodes corresponding to the press positions are detected.

In one or more embodiments, the first sensing electrodes and the second sensing electrodes are located on different planes. A stress neutral plane is disposed on a symmetrical center plane between the planes where the first sensing electrodes and the second sensing electrodes are located.

In one or more embodiments, the first sensing electrodes and the second sensing electrodes are strip electrodes.

In one or more embodiments, an output line and an input line are respectively disposed at two ends of each of the first sensing electrodes. An output line and an input line are respectively disposed at two ends of each of the second sensing electrodes.

The multi-force touch sensing method and multi-force touch module provided by the present disclosure can be pressed to generate stress so as to obtain resistance changes, which, in cooperation with the mutual capacitive position sensing, realizes the accurate press position detection and force magnitude detection of multi-touch input. During multi-touch input, influences generated between press force signals of a plurality of press positions and positions adjacent to the plurality of press positions are smaller than influences generated in capacitive pressure touch sensing. Hence, the influences between various points caused by force touch are effectively reduced to avoid interferences of press signals between the press positions. As a result, the function of distinguishing plural press forces is achieved.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure. In the drawings.

DESCRIPTION OF THE EMBODIMENTS

Figure 1A:
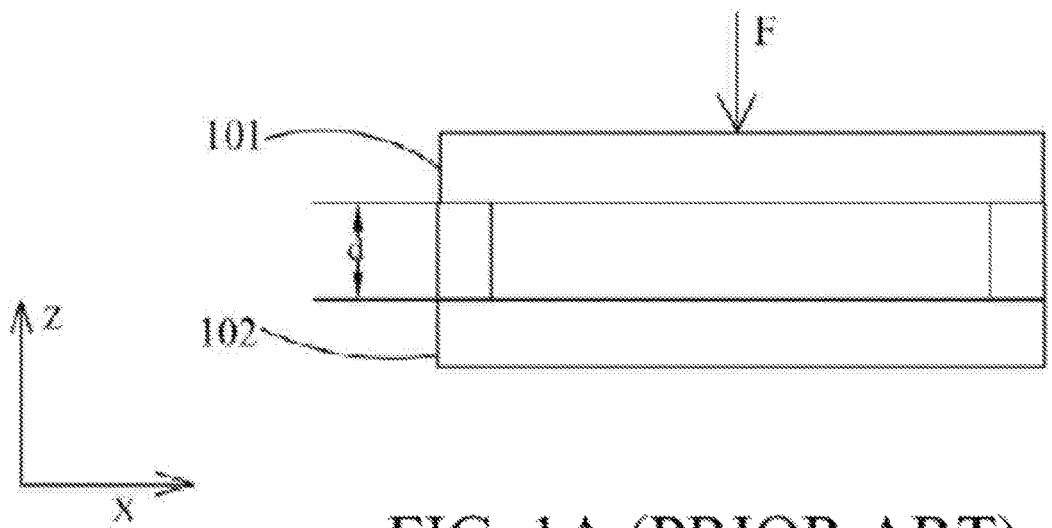
FIG. 1A to FIG. 1B depict a schematic diagram showing touch positions on an electronic device according to the present disclosure.
Figure 1B:
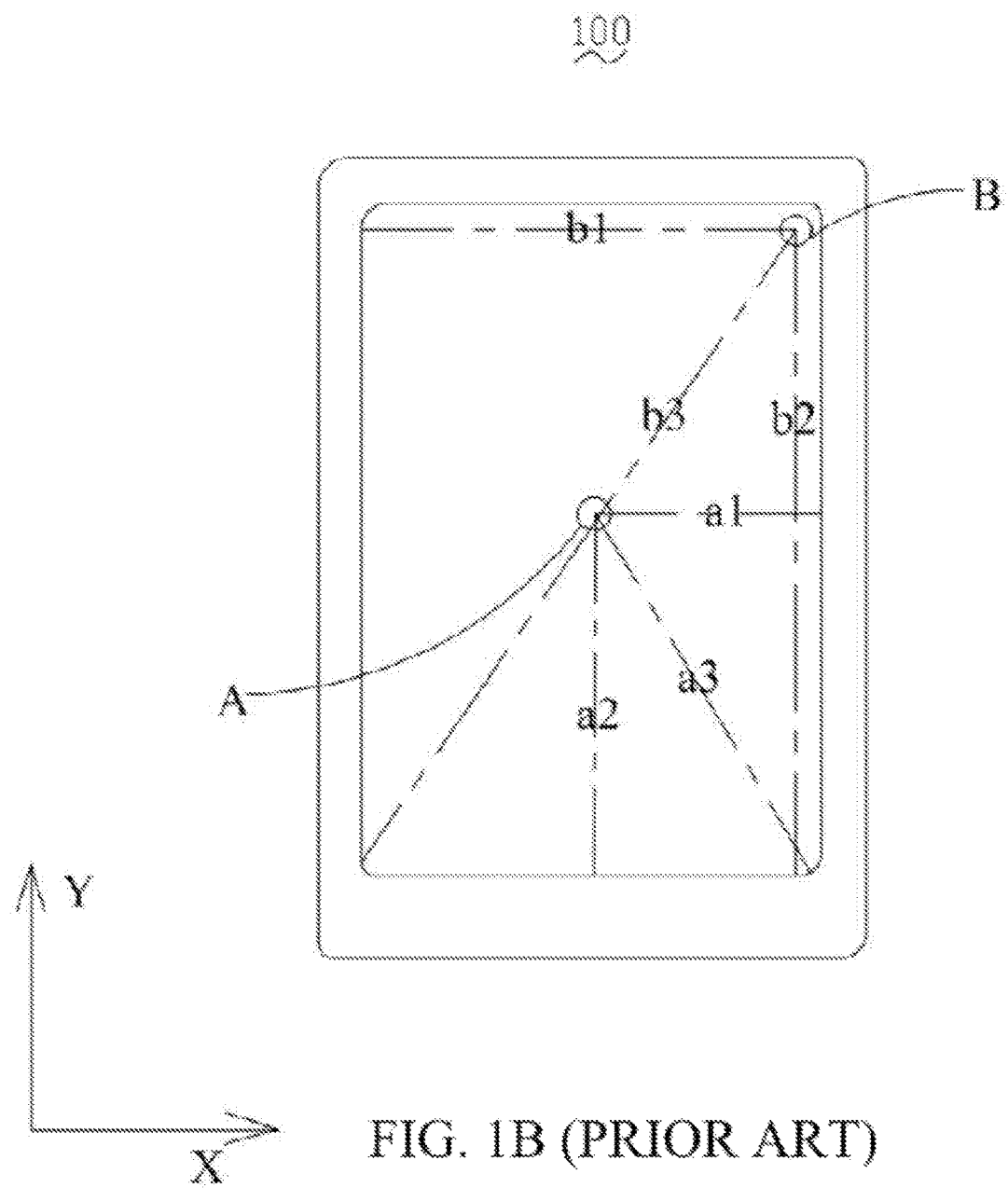
Figure 2A:
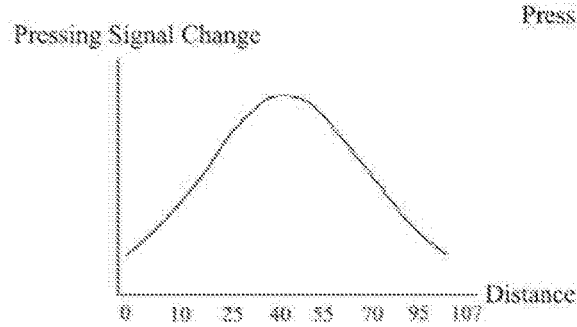
FIG. 2A to FIG. 2D are a pressing signal change—a press distance curves sensed by two-finger touch by using a capacitive sensing method.
Figure 3A:
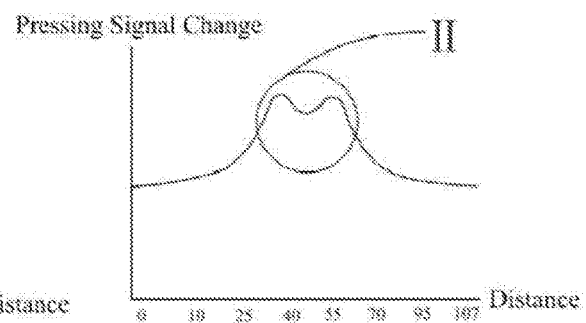
FIG. 3A to FIG. 3D are a pressing signal change—a press distance curves sensed by two-finger touch by using a resistive sensing method.
Figure 2B:
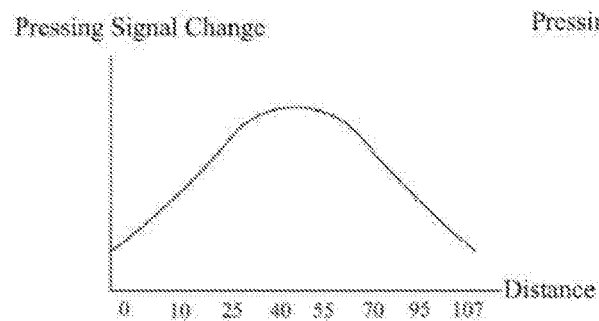
Figure 3B:
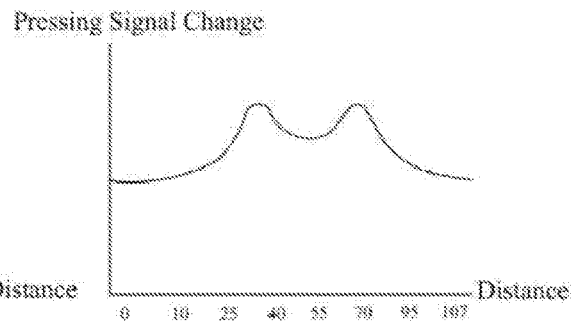
Figure 2C:
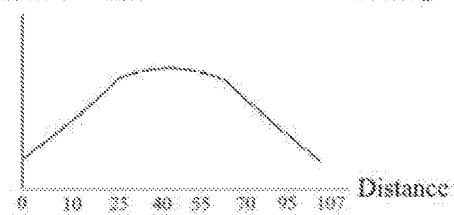
Figure 3C:
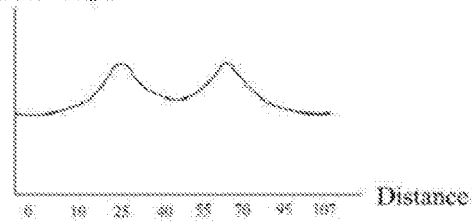
Figure 2D:
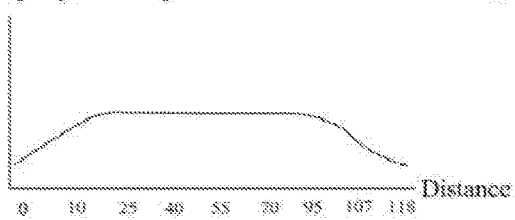
Figure 3D:
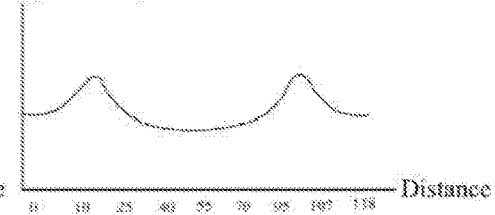

Reference will now be made in detail to the present embodiments of the disclosure, examples of which are illustrated in the accompanying drawings. Wherever possible, the same reference numbers are used in the drawings and the description to refer to the same or like parts.

In order to solve the problem caused by capacitive pressure sensing according to the prior art, the present disclosure provides a multi-force touch sensing method and a module using the same.

The present disclosure provides a multi-force touch module. The multi-force touch module utilizes a resistance value change caused by pressing a traditional touch electrode to determine a magnitude of a pressing force, that is, the resistive pressure sensing principle is utilized. A detailed description is provided as follows:

A piezoresistive material, such as a transparent conductive oxide, is utilized to fabricate an electrode. The electrode itself generates strain after being pressed. The strain is a micro change that has a smaller influence range than the influence range of deformation. Although the overall structure (compression or expansion of material caused by a force) or the internal configuration (molecular gap, etc.) of the piezoresistive material will have a slight change (that is, strain) after being pressed, the resistance value is obviously changed. The greater the pressure is, the more obvious the strain is, and correspondingly the greater the resistance value change is. Strain usually occurs at positions being obviously pressed, and a mere position change usually would not cause obvious strain.

Figure 4:
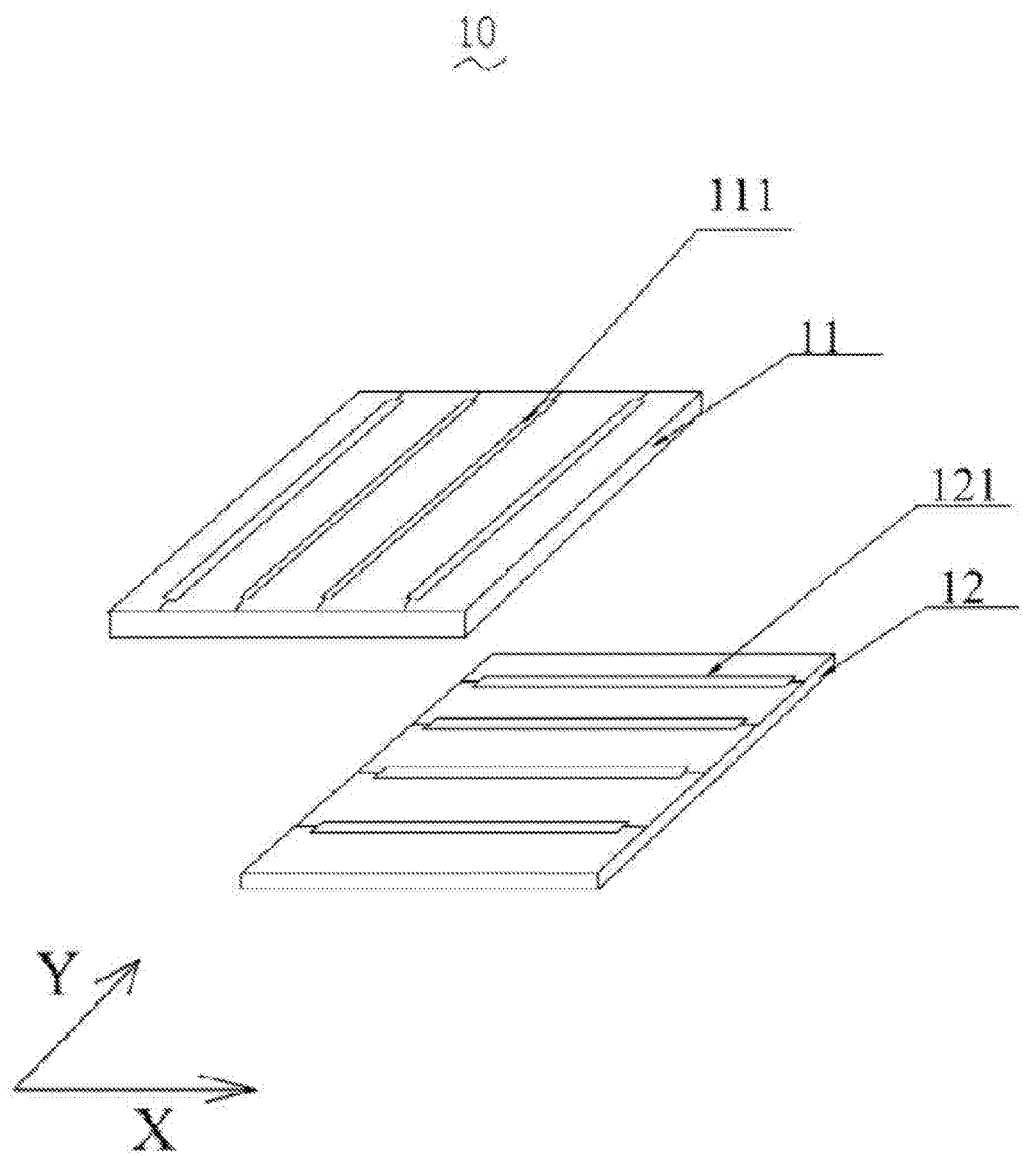
FIG. 4 depicts a schematic diagram of a stack structure of a multi-force touch module according to one or more embodiments of the present disclosure.

Reference is now made to FIG. 4. A multi-force touch module 10 is provided according to one or more embodiments of the present disclosure. The multi-force touch module 10 includes a first substrate 11 and a second substrate 12. First sensing electrodes 111 are disposed on the first substrate 11 along a first direction and equally spaced apart. Each of the first sensing electrodes 111 is a strip electrode extending along a second direction. Second sensing electrodes 121 are disposed on the second substrate 12 along the second direction and equally spaced apart. Each of the second sensing electrodes 121 is a strip electrode extending along the first direction. A specific angle exists between the first direction and the second direction. In the present embodiment, the first direction and the second direction are selected to be orthogonal to each other so as to form a Cartesian coordinate system. The first direction is X direction and the second direction is Y direction according to the present embodiment. In other embodiments, the first direction and the second direction are some other directions and are not enumerated herein.

As shown in FIG. 4, the four first sensing electrodes 111 and the four second sensing electrodes 121 are taken as an example for illustration in the present embodiment. In practice, numbers of the first sensing electrodes 111 and the second sensing electrodes 121 are not limited. In some embodiments, the first sensing electrodes 111 and the second sensing electrodes 121 are all strip electrodes to realize the electrodes equally spaced apart.

In some embodiments, the first sensing electrodes 111 and the second sensing electrodes 121 are respectively located on an upper surface and a lower surface of a substrate. In order to allow extents of resistance value changes of the first sensing electrodes 111 and the second sensing electrodes 121, after being applied by forces, to be roughly equivalent, thicknesses and Young's modulus of various layers are designed in some embodiments, such that a stress neutral plane of the multi-force touch module 10 is disposed on a symmetrical center plane between the two electrode layers. This design can further increase sensitivity of pressure sensing of a pressure sensing input module effectively.

The first sensing electrode 111 and the second sensing electrode 121 are a metal oxide, such as indium tin oxide (ITO), antimony doped tin oxide (ATO), indium zinc oxide (IZO), aluminum zinc oxide (AZO), and the like, or any of graphene, a metal grid, a transparent conductive polymer material, and a carbon nanotube.

Figure 5:
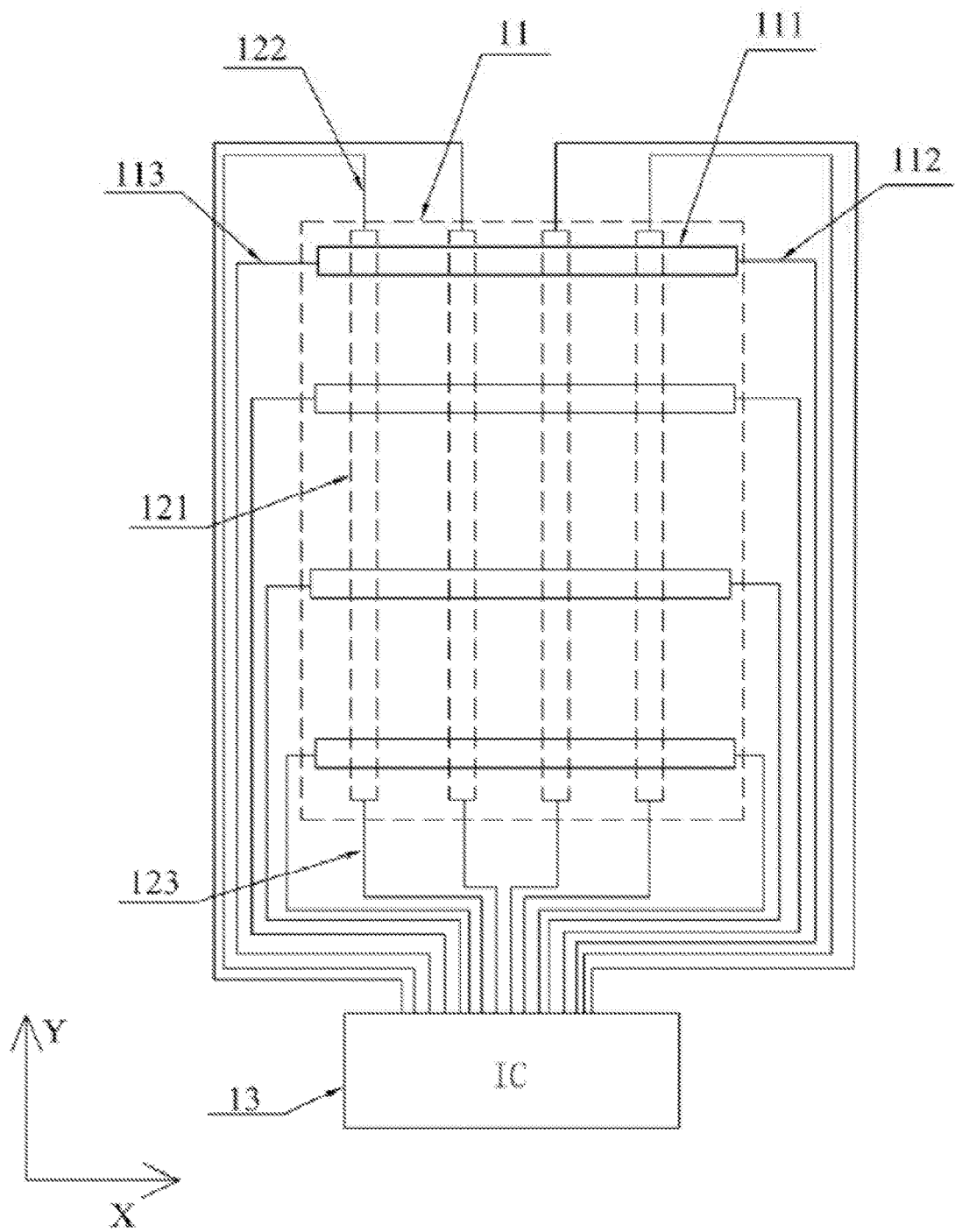
FIG. 5 is a schematic diagram of a plane structure of first sensing electrodes and second sensing electrodes of the a multi-force touch module in FIG. 4.

Reference is now made to FIG. 5. In order to detect changes of resistance values, connecting lines of the first sensing electrodes 111 and the second sensing electrodes 121 are disposed from double sides, so as to connect the first sensing electrodes 111 and the second sensing electrodes 121 to a control center (that is, an integrated circuit (IC)). That is, a first output line 112 and a first input line 113 are respectively disposed at opposite ends of each of the first sensing electrodes 111. The first output lines 112 and the first input lines 113 are connected to an IC 13. A second output line 122 and a second input line 123 are respectively disposed at opposite ends of each of the second sensing electrodes 121. The second output lines 122 and the second input lines 123 are connected to the IC 13.

A material of the first output lines 112, the first input lines 113, the second input lines 123, and the second output lines 122 is not limited to a material of the first sensing electrodes 111 and the second sensing electrodes 121, which can further be metal such as molybdenum, aluminum, copper, gold, silver, and the like, or alloys thereof.

The first substrate 11 and the second substrate 12 are rigid substrates, such as glass, reinforced glass, sapphire glass, and the like. The first substrate 11 and the second substrate 12 are flexible substrates, such as polyetheretherketone (PEEK), polyimide (PI), polyethylene terephthalate (PET), polycarbonate (PC), poly(ethylene succinate) (PES), polymethylmethacrylate (PMMA), or composites of any two thereof. The first substrate 11 and the second substrate 12 are a substrate embedded between a cover plate and a display module, or are at least one of the cover plate and the display module.

In the present disclosure, a time-division multiplexing drive is utilized to drive the first sensing electrodes 111 and the second sensing electrodes 121 so as to more accurately detect position information of touch points and a magnitude of a pressing force at each of the touch points. During a first time sequence, the first sensing electrodes 111 and the second sensing electrodes 121 perform mutual capacitive position sensing. During a second time sequence, the first sensing electrodes 111 and the second sensing electrodes 121 perform resistive pressure sensing.

A pressing method (such as using the pressing forces having the same magnitude to respectively press position A and position B) same as the pressing method in the capacitive pressure sensing is performed to the multi-force touch module 10 according to the one or more embodiments of the present disclosure. Extents of strains (changes of resistance values are measurement criteria) of the press positions and the positions adjacent to the press positions are detected and data are recorded to obtain detecting data shown in the following Table 2A and Table 2. A detailed description is provided as follows:

TABLE 2A

The relational table of changes of strain extents (resistance values) after position A is pressed by a pressing force in resistive pressure sensing.

| Item | Press Position | 1st Position | 2nd Position | 3rd Position | 4th Position | 5th Position |
| --- | --- | --- | --- | --- | --- | --- |
| X Direction (a1) | 100% | 73% | 50% | 38% | 12% | 0% |
| Y Direction (a2) | 100% | 83% | 76% | 60% | 55% | 52% |
| Diagonal Direction (a3) | 100% | 83% | 75% | 37% | 21% | 8% |

TABLE 2B

The relational table of changes of strain extents (resistance values) after position B is pressed by a pressing force in resistive pressure sensing.

| Item | Press Position | 1st Position | 2nd Position | 3rd Position | 4th Position | 5th Position |
| --- | --- | --- | --- | --- | --- | --- |
| X Direction (b1) | 100% | 42% | 29% | 25% | 12% | 0% |
| Y Direction (b2) | 100% | 68% | 36% | 14% | 5% | 0% |
| Diagonal Direction (b3) | 100% | 55% | 32% | 23% | 5% | 0% |

It is thus understood by comparing Table 1A and Table 1B with Table 2A and Table 2B, no matter whether position A or position B is pressed, change amounts of resistance values between the actual press position and the positions adjacent to the actual press position is greater (the difference is at least about 20%) when the resistive sensing method is employed, as compared with the difference less than about 10% in the capacitive sensing method. Using the resistive pressure sensing can more accurately and effectively distinguish the magnitudes of pressing forces at adjacent positions as compared with the capacitive pressure sensing.

Reference is now made to FIG. 3A to FIG. 3D, in which the pressing method is the same as that shown in FIG. 2A to FIG. 2D. Distances between the press positions by the two fingers are respectively 10 mm, 20 mm, 30 mm, and 60 mm in FIG. 3A-FIG. 3D. As compared with the capacitive pressure sensing method, peak values caused by obvious resistance value changes exist at the press positions by the two fingers (As shown by II in FIG. 3A, the other FIGS. 3B-3D all have obvious peak resistance values) when the resistive pressure sensing method is employed. Areas where the peak values of the resistance values are obvious are the actual press positions by fingers. It is thus understood that using the resistive pressure sensing method can effectively distinguish multi touch.

In summary, by using the multi-force touch module 10 having the double-sided wiring according to the present disclosure to sense a pressing force, the sensed resistance value change generated by the pressing force is a micro change, as compared with the capacitive pressure sensing in which the magnitude of force change is obtained based on the macro distance change between electrodes. Hence, an influence range is smaller, differences between the influence on the press position and influences on the positions adjacent to the press position by the pressing force are greater when the resistive pressure sensing is used, thus more easily distinguishing the magnitudes of forces between the press position and the positions adjacent to the press position to increase the sensing accuracy and sensitivity.

Mutual capacitive position sensing scanning pulses and resistive pressure scanning pulses are provided during different time sequences according to the present embodiment. By employing time-division multiplexing detection, the objectives of realizing accurate position detection and multi-force detection are achieved through only one set of electrodes.

Figure 6:
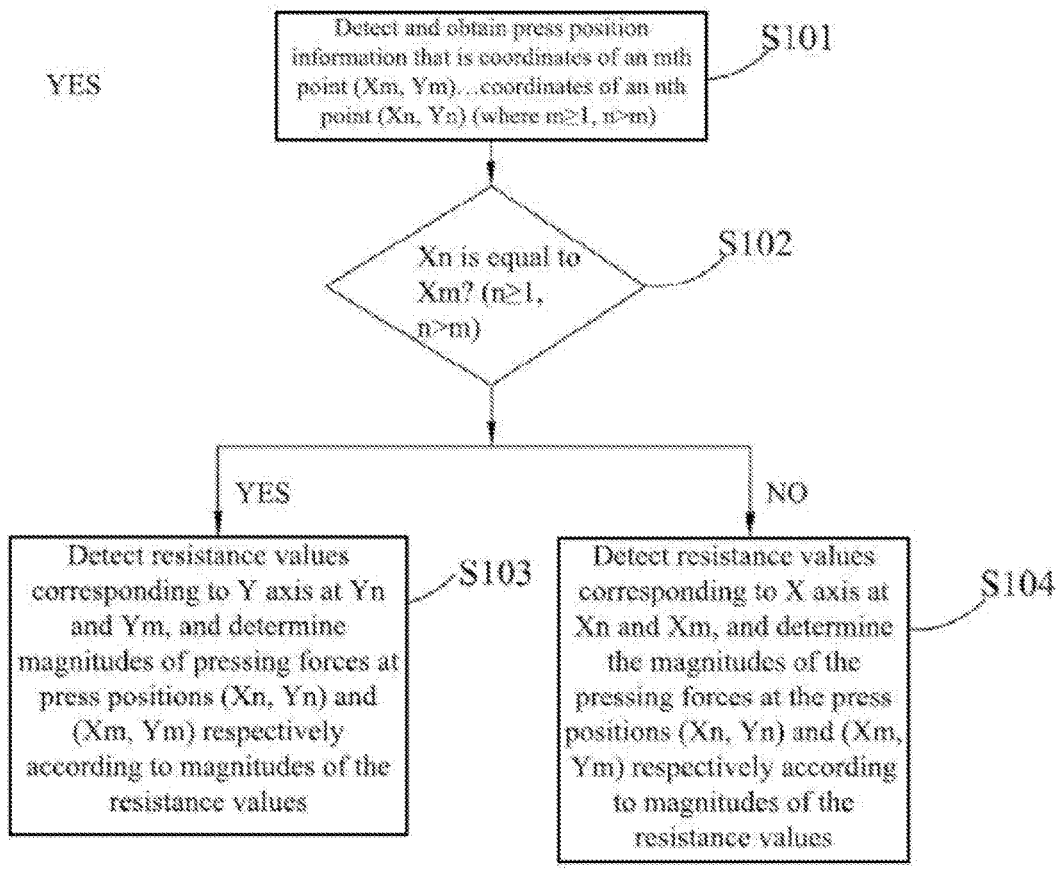
FIG. 6 is a schematic diagram of a flow of a multi-force touch sensing method according to one or more embodiments of the present disclosure.

According to the multi-force touch sensing method provided by the present disclosure, the manufacturing method of an electrode pattern of the multi-force touch module 10 is the same as the manufacturing method of the capacitive touch electrodes having the double-sided wiring according to the prior art, and can be completed by using the prior art to ensure a specific yield rate. At the same time, a routing method incorporating the double-sided wiring can avoid that metal lines are disposed in a visible area, which does not cause a poor appearance because of the visible lines. A detailed description of the sensing method is provided as follows:

Reference is now made to FIG. 6. One or more embodiments of the present disclosure provide a multi-force touch sensing method. The multi-force touch module 10 forms an X-Y coordinate system (X is the first direction, first sensing electrodes 111 are disposed along X direction and equally spaced apart, and are sequentially marked as X1, X2, X3 . . . , Y is the second direction, second sensing electrodes 121 are disposed along Y direction and equally spaced apart, and are sequentially marked as Y1, Y2, Y3 . . . ), to provide t least one press input. The multi-force touch sensing method includes the following steps:

Step S101: detecting and obtaining press position information that is coordinates of an mth point (Xm, Ym) . . . coordinates of an nth point (Xn, Yn) (where m≥1, n>m);

Step S102: determining whether Xn is equal to Xm. If yes, step S103 is performed. If not, step S104 is performed;

Step S103: detecting resistance values corresponding to Y axis at Yn and Ym, and determining magnitudes of pressing forces at press positions (Xn, Yn) and (Xm, Ym) respectively according to magnitudes of the resistance values; and Step S104: detecting resistance values corresponding to X axis at Xn and Xm, and determining the magnitudes of the pressing forces at the press positions (Xn, Yn) and (Xm, Ym) respectively according to magnitudes of the resistance values.

In greater detail, a system of the multi-force touch module 10 further records the following data: a mutual capacitance value between each of the first sensing electrodes 111, which are not pressed, and each of the second sensing electrodes 121, which are not pressed, being recorded as a normal mutual capacitance value, a resistance value of each of the first sensing electrodes 111, which are not pressed, and each of the second sensing electrodes 121, which are not pressed, being recorded as an initial resistance value, and corresponding relationships between resistance value changes and the magnitudes of the pressing forces corresponding to the resistance value changes. A detailed description of step S101, step S103, and step S104 of the multi-force touch sensing method is provided as follows:

In step S101, drive the first sensing electrodes 111 sequentially, and scan the second sensing electrodes 121 simultaneously or sequentially after driving each of the first sensing electrodes 111. Compare the mutual capacitance value thus scanned with the above normal mutual capacitance value. An abnormal mutual capacitance value is recorded when the mutual capacitance value thus scanned is not the same as the normal mutual capacitance value, and determine XY coordinates of the press position according to a position of the second sensing electrode 121 where the abnormal mutual capacitance value is scanned on Y axis and a position of the first sensing electrode 111 on X axis.

In step S103, scan the resistance values of the second sensing electrodes 121 located at Yn and Ym and record the resistance values as the press resistance values. Record differences between the press resistance values and the initial resistance value as the resistance value changes, and determine the resistance value changes thus recorded to be the magnitudes of the pressing forces at the press positions (Xn, Yn) and (Xm, Ym) according to the corresponding relationships between the resistance value changes and the magnitudes of the pressing forces preset by the system.

In step S104, scan the resistance values of the first sensing electrodes 111 located at Xn and Xm and record the resistance values as press resistance values. Record differences between the press resistance values and the initial resistance value as the resistance value changes, and determine the resistance value changes thus recorded to be the magnitudes of the pressing forces at the press positions (Xn, Yn) and (Xm, Ym) according to the corresponding relationships between the resistance value changes and the magnitudes of the pressing forces preset by the system.

In the present embodiment, the mutual capacitive touch position scan is performed during the first time sequence in step S101 to detect the press positions, and the resistive pressure scan is performed during the second time sequence in step S103 or step S104 to detect the magnitudes of the pressing forces.

Figure 7:
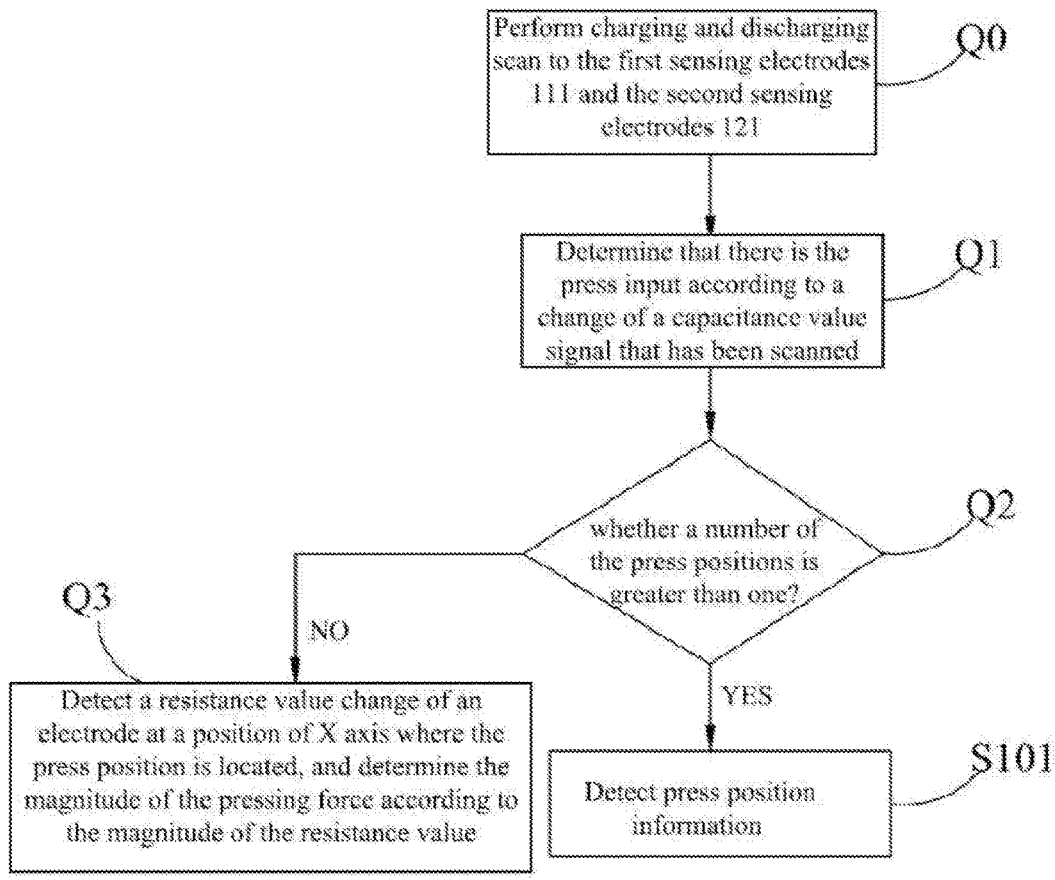
FIG. 7 is a schematic diagram of a flow of steps performed before step S101 of the multi-force touch sensing method in FIG. 6.

Reference is now made to FIG. 7. The following steps are further included before step S101 is performed:

Step Q0: perform charging and discharging scan to the first sensing electrodes 111 and the second sensing electrodes 121;

Step Q1: determine that there is the press input according to a change of a capacitance value signal that has been scanned, and then go to step Q2;

Step Q2: determine whether a number of the press positions is greater than one. If yes, step S101 is performed. If not, step Q3 is performed.

Step Q3: detect the resistance value change of an electrode at a position of X axis where the press position is located, and determine the magnitude of the pressing force according to the magnitude of the resistance value.

By using the above steps Q0-Q3, the detection of input positions and magnitudes of forces in a single-point press input or multi-point press input is achieved.

Figure 8A:
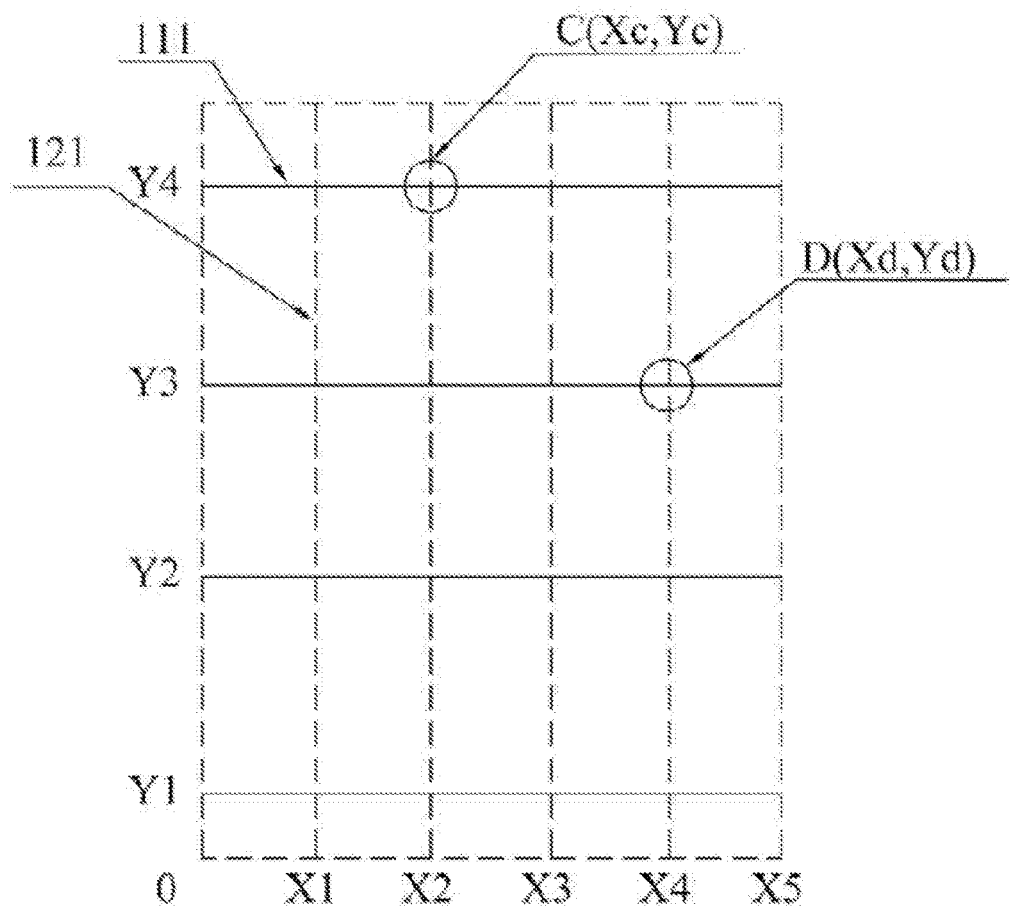
FIG. 8A to FIG. 8B are schematic diagrams of press positions detected by using the multi-force touch sensing method in FIG. 6 by a multi-force touch module.
Figure 8B:
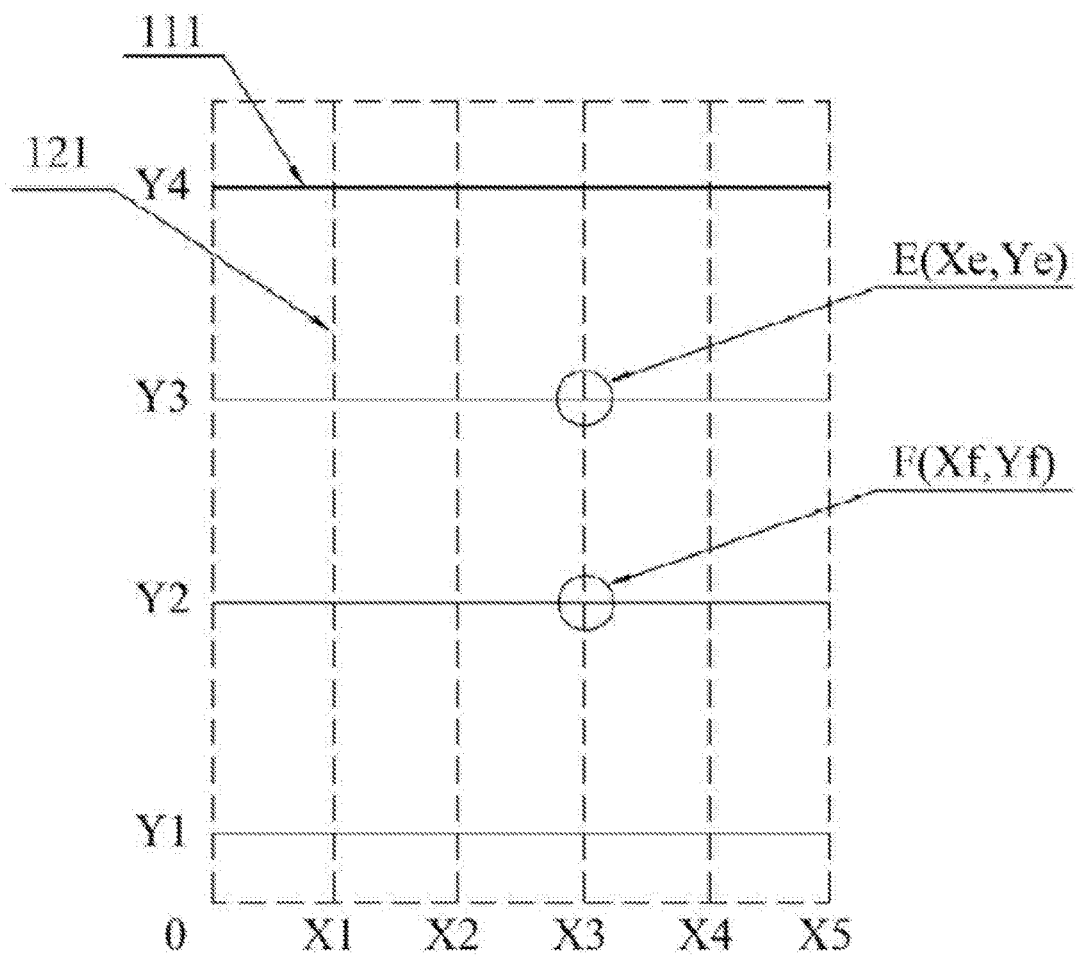

As shown in FIG. 8A and FIG. 8B, the principle of the multi-force touch sensing method is provided as follows by taking two points as an example to determine the multi-point press input:

As shown in FIG. 8A, when the press positions are detected to be position C and position D, coordinates of position C (2,4) and coordinates of position D (4,3) are obtained. Since X coordinate of position C Xc=2 is not equal to X coordinate of position D Xd=4, it is only necessary to respectively detect the resistance value changes of electrodes at positions of X axis where position C and position D are located, that is, to detect the resistance value changes of an electrode X2 and an electrode X4. Then, the magnitudes of the pressing forces at position C and position D are respectively determined according to the corresponding relationships between the resistance value changes and the magnitudes of the pressing forces.

As shown in FIG. 8B, when the press positions are detected to be position E and position F, coordinates of position E (3,3) and coordinates of position F (3,2) are obtained. Since X coordinate of position E Xe=3 is equal to X coordinate of position F Xf=3, it is only necessary to respectively detect the resistance value changes of electrodes at positions of Y axis where position E and position F are located, that is, to detect the resistance value changes of an electrode Y3 and an electrode Y2. Then, the magnitudes of the pressing forces at position E and position F are respectively determined according to the corresponding relationships between the resistance value changes and the magnitudes of the pressing forces.

Since the multi-point press detection method processing three or more points is similar to the method that processes two points, a description in this regard is not provided.

As compared with the prior art, the multi-force touch sensing method and the multi-force touch module 10 provided by the present disclosure have the following advantages:

(1). The multi-force touch module 10 according to the present disclosure uses the traditional touch electrode pattern having the double-sided wiring. The pattern is simple without increasing manufacturing steps and the production yield rate is ensured. By utilizing the mutual capacitive position detection method, the accuracy of position detection is ensured.

(2). The detection of press position information and magnitudes of pressing forces are performed during different time sequences in the multi-force touch sensing method and multi-force touch module 10 according to the present disclosure. Through scanning the mutual capacitances between the first sensing electrodes 111 and the second sensing electrodes 121, the detection of press position information is realized. The magnitudes of the pressing forces at the press positions are thus determined by detecting the resistance value changes at the press positions through scanning the first sensing electrodes 111 or the second sensing electrodes 121 according to the press position information. As a result, the more accurate press position detection and force magnitude detection are obtained by using the above method.

(3). The multi-force touch sensing method and multi-force touch module 10 according to the present disclosure includes determining whether the press positions are located in the first direction first, and only detecting the resistance value changes corresponding to the press positions in the first direction (the first sensing electrodes 111) or the second direction (the second sensing electrode 121) according to the result thus determined, and finally determining the magnitudes of the pressing forces at the press positions according to the magnitudes of the resistance value changes. As compared with the method in which the resistance value changes in a large area need to be detected, energy consumption is saved.

(4). By using the multi-force touch sensing method according to the present disclosure, magnitudes of different pressing forces at different points are detected to further extend functional applications of the multi-force touch module so as to realize single-finger swipe, two-finger swipe, or multi-finger swipe. Different application operations are thus performed. For example, single-finger swipe can perform operations, such as program activation, page switching, returning to the main page, and the like, correspondingly. Two-finger swipe or multi-finger swipe can perform operations, such as program selection, program removing, screen locking, and the like. Operations correspond to gestures can be customized by users or preset by the system, and the present disclosure is not limited in this regard.

According to some embodiments of the present disclosure, an effective value is used to determine whether the touch input is effective. In greater detail, when a magnitude of a force value of a press input exceeds the effective value, the press input is determined as an effective gesture. At least one threshold value of the magnitude of the pressing force can further be set. Through setting different threshold values of the magnitude of the pressing force, the magnitudes of the force value are classified into three strength, that is light, medium and heavy, to realize more operations. Threshold values can be set depending on the characteristics of pressing by each different finger. For example, when two fingers press the resistive pressure touch panel, one of the fingers presses lightly and the other finger presses heavily and a specific gesture operation is thus performed.

In practical applications, the operations can further be: when the interface displays text, a font size is increased or decreased correspondingly when a distance between fingers becomes longer or shorter if the press force of the fingers is less than a preset value. If the press force of the fingers is more than the preset value, brightness of a display interface is increased or decreased correspondingly when the distance between the fingers becomes longer or shorter. When the interface is a music player interface, sound volume of music is turned up or down correspondingly when the distance between the fingers becomes longer or shorter if the press force of the fingers is more than the preset value. The above description is only for illustration, and the embodiments of the present disclosure are not limited in this regard.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims and their equivalents.

What is claimed is:

1. A multi-force touch sensing method for a multi-force touch module, the multi-force touch module comprising a plurality of first sensing electrodes disposed along an X direction and a plurality of second sensing electrodes disposed along a Y direction, which form an X-Y coordinate system, to provide at least one press input, and the multi-force touch sensing method comprising the following steps:

(a): detecting and obtaining press position information that are coordinates of an mth point (Xm, Ym) and coordinates of an nth point (Xn, Yn) (where m≥1, n>m) during a first time sequence;

(b): determining whether Xn is equal to Xm, if yes, go to (c), if not, go to (d);

(c): detecting resistance values corresponding to Y axis at Yn and Ym during a second time sequence different from the first time sequence, determining, from only a magnitude of the resistance value corresponding to the Y axis at Yn, a magnitude of a pressing force at press position (Xn, Yn), and determining, from only a magnitude of the resistance value corresponding to the Y axis at Ym, a magnitude of a pressing force at press position (Xm, Ym); and (d): detecting resistance values corresponding to X axis at Xn and Xm during the second time sequence different from the first time sequence, determining, from only a magnitude of the resistance value corresponding to the X axis at Xn, the magnitude of the pressing force at the press position (Xn, Yn), and determining, from only a magnitude of the resistance value corresponding to the X axis at Xm, the magnitude of the pressing force at the press position (Xm, Ym).

2. The multi-force touch sensing method of claim 1, wherein the multi-force touch module is configured to record a mutual capacitance value between each of the first sensing electrodes that are not pressed and each of the second sensing electrodes that are not pressed as a normal mutual capacitance value.

3. The multi-force touch sensing method of claim 2, wherein the step (a) comprises:
  driving the first sensing electrodes sequentially;
  scanning the second sensing electrodes simultaneously or sequentially after each of the first sensing electrodes is driven;
  comparing a scanned mutual capacitance value with the normal mutual capacitance value;
  when the scanned mutual capacitance value is not the same as the normal mutual capacitance value, recording an abnormal mutual capacitance value; and
  determining X-Y coordinates of the press position according to a position of the second sensing electrode where the abnormal mutual capacitance value is scanned on Y axis and a position of the first sensing electrode on X axis.

4. The multi-force touch sensing method of claim 1, wherein the multi-force touch module is configured to record a resistance value of each of the first sensing electrodes that are not pressed and the second sensing electrodes that are not pressed as an initial resistance value and corresponding relationships between resistance value changes and the magnitudes of the pressing forces corresponding to the resistance value changes.

5. The multi-force touch sensing method of claim 4, wherein the step (c) comprises:
  scanning the resistance values of the second sensing electrodes located at Yn and Ym and recording the resistance values as press resistance values;
  recording differences between the press resistance values and the initial resistance value as the resistance value changes; and
  determining the resistance value changes to be the magnitude of the pressing force at the press position (Xn, Yn) and the magnitude of the pressing force at the press position (Xm, Ym) according to the corresponding relationships between the resistance value changes and the magnitudes of the pressing forces.

6. The multi-force touch sensing method of claim 4, wherein the step (d) comprises:
  scanning the resistance values of the first sensing electrodes located at Xn and Xm and recording the resistance values as press resistance values;
  recording differences between the press resistance values and the initial resistance value as the resistance value changes; and
  determining the resistance value changes to be the magnitude of the pressing force at the press position (Xn, Yn) and the magnitude of the pressing force at the press position (Xm, Ym) according to the corresponding relationships between the resistance value changes and the magnitudes of the pressing forces.

7. The multi-force touch sensing method of claim 1, further comprising the following steps before step (a) is performed:

(e): performing charging and discharging scan to the first sensing electrodes and the second sensing electrodes;

(f): determining that there is the at least one press input according to a change of a capacitance value signal that has been scanned, and then going to step (g);

(g): determining whether a number of press positions is greater than one, if yes, going to step (a), if not, going to step (h); and (h): detecting a resistance value change of an electrode at a position of X axis where the press position is located, and determining the magnitude of the pressing force according to the resistance value change.

8. A multi-force touch module comprising:
  a plurality of first sensing electrodes disposed along X axis; and
  a plurality of second sensing electrodes disposed along Y axis, wherein the first sensing electrodes and the second sensing electrodes are configured to provide at least one press input in an X-Y coordinate system;
  an integrated circuit configured to:
    (a): detecting and obtaining press position information that are coordinates of an mth point (Xm, Ym) and coordinates of an nth point (Xn, Yn) (where m≥1, n>m) during a first time sequence;
    (b): determining whether Xn is equal to Xm, if yes, go to (c), if not, go to (d);
    (c): detecting resistance values corresponding to Y axis at Yn and Ym during a second time sequence different from the first time sequence, determining, from only a magnitude of the resistance value corresponding to the Y axis at Yn, a magnitude of a pressing force at press position (Xn, Yn), and determining, from only a magnitude of the resistance value corresponding to the Y axis at Ym, a magnitude of a pressing force at press position (Xm, Ym); and
    (d): detecting resistance values corresponding to X axis at Xn and Xm during the second time sequence different from the first time sequence, determining, from only a magnitude of the resistance value corresponding to the X axis at Xn, the magnitude of the pressing force at the press position (Xn, Yn), and determining, from only a magnitude of the resistance value corresponding to the X axis at Xm, the magnitude of the pressing force at the press position (Xm, Ym).

9. The multi-force touch module of claim 8, wherein the first sensing electrodes and the second sensing electrodes are located on different planes, and a stress neutral plane is disposed on a symmetrical center plane between the planes where the first sensing electrodes and the second sensing electrodes are located.

10. The multi-force touch module of claim 8, wherein the first sensing electrodes and the second sensing electrodes are strip electrodes.

11. The multi-force touch module of claim 8, wherein an output line and an input line are respectively disposed at two ends of each of the first sensing electrodes, an output line and an input line are respectively disposed at two ends of each of the second sensing electrodes.

12. The multi-force touch module of claim 8, wherein the first sensing electrodes and the second sensing electrodes comprise a piezoresistive material.

\* \* \* \* \*